Feb. 20, 1923.
G. W. MILLER
DOUBLE SAW SET
Filed Oct. 3, 1921
1,446,428
3 sheets-sheet 1
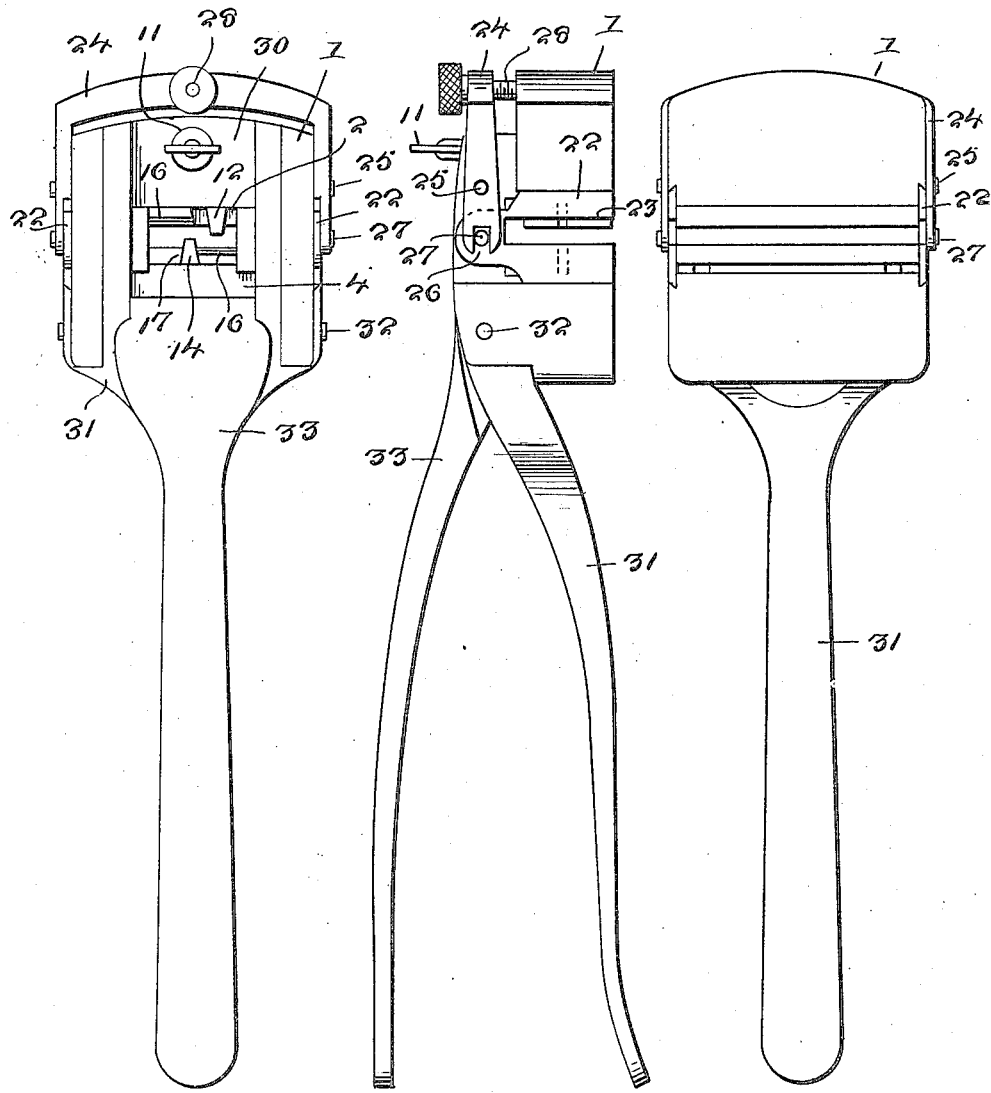

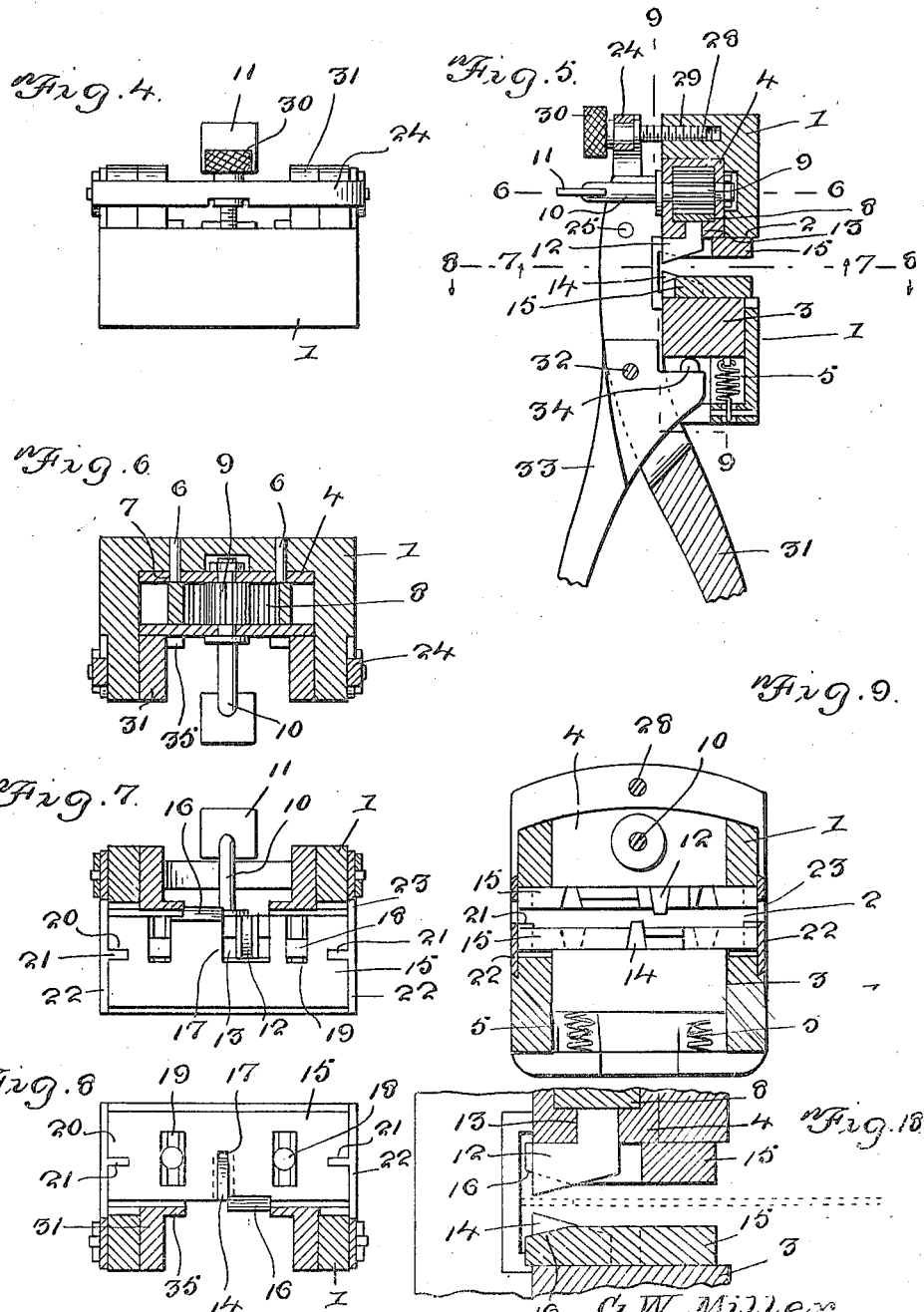

Feb. 20, 1923.
G. W. MILLER
DOUBLE SAW SET
Filed Oct. 3, 1921
1,446,428
3 sheets-sheet 3
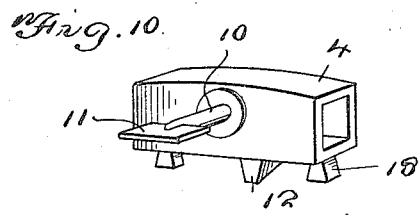
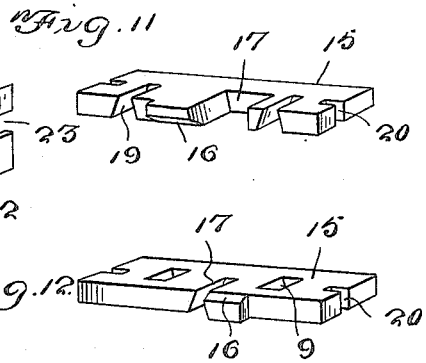
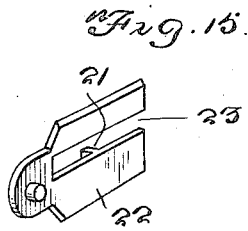
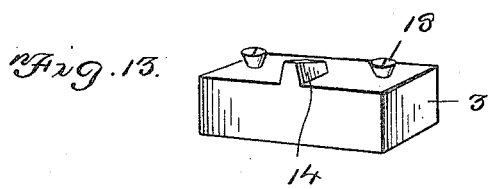
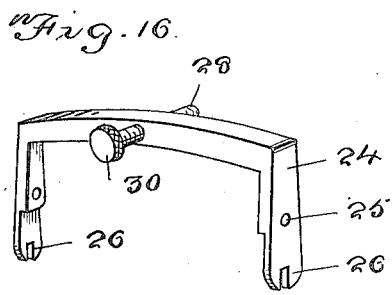
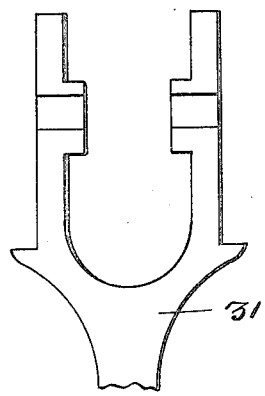
G. W. Miller
INVENTOR
BY Victor J. Evans
ATTORNEY Patented Feb. 20, 1923.

1,446,428

UNITED STATES PATENT OFFICE.

GEORGE WESLEY MILLER, OF WOODROW, NORTH CAROLINA.

DOUBLE SAW SET.

Application filed October 3, 1921. Serial No. 504,979.

*To all whom it may concern:*

Be it known that I, GEORGE W. MILLER, a citizen of the United States, residing at Woodrow, in the county of Haywood and State of North Carolina, have invented new and useful Improvements in Double Saw Sets, of which the following is a specification.

This invention relates to a saw set, the general object of the invention being to provide means for setting opposing sets of the teeth of the saw so that it is not necessary to first set the teeth on one side and then the teeth on the other side as is done with the old style set.

Another object of the invention is to provide means whereby the parts can be adjusted to make a fine or coarse set.

A further object of the invention is to provide means whereby the set can be taken out of the teeth when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the invention.
Figure 2 is a side view thereof.
Figure 3 is a rear view.
Figure 4 is an end view.
Figure 5 is a longitudinal sectional view.
Figure 6 is a section on line 6—6 of Figure 5.
Figure 7 is a section on line 7—7 of Figure 5, looking in one direction.
Figure 8 is a section on line 8—8 of Figure 5 looking in the other direction.
Figure 9 is a section on line 9—9 of Figure 5.
Figure 10 is a perspective view of the block 4.
Figures 11 and 12 are views of the gage plates.
Figure 13 is a view of the block 3.
Figures 14 and 15 are views of the side plates.
Figure 16 is a view of the yoke member 24.
Figure 17 is a view of the forked end of the stationary handle.
Figure 18 is an enlarged longitudinal section of the parts shown in Figure 5 showing a saw in dotted lines.

In these views 1 indicates a casing which is provided with a centrally located slot 2 in its lower part which divides the casing into two chambers. Blocks 3 and 4 are located in said chambers, the block 3 being normally held within the chamber by the contractible springs 5 while the block 4 is held stationary in its chamber by means of the pins 6 in the bottom of the chamber engaging recesses 7 in the bottom of the block. Block 4 is hollow and has slidably mounted therein a rack bar 8 which is adapted to be moved by the pin 9 on the stem 10 which is rotatably mounted in the block and is provided with a handle 11 which is located above the upper open end of the casing. The rack bar 8 carries the setting member 12 which has its connecting piece extending through a slot 13 formed in the front face of the block 4. In this way the setting member can be adjusted lengthwise of the block. Setting member 14 is firmly attached to block 3 so that this member is not adjustable.

Gage plates 15 engage the inner face of the blocks, each plate being provided with a beveled projection 16 on its upper edge for cooperating with the setting member on the opposing block and each gage plate is provided with a notch 17 through which the setting member extends, the notch for the adjustable setting member 12 being made of sufficient width to permit the adjustment of this member. The gage plates are vertically adjustable on the blocks by means of the lugs 18 on the blocks engaging slots 19 in the plates, the lugs on the spring controlled block 3 being screw lugs. The ends of the gage plates are notched, as at 20, for receiving projections 21 on vertically adjustable plates 22 mounted on the outer sides of the casing and having beveled edges engaging under cut grooves in the sides of the casing. These plates are slotted, as at 23, for receiving the saw and they are adjusted by means of the yoke member 24 pivoted to the sides of the casing, as at 25, and having their notched ends 26 engaging projections 27 at the upper ends of the plates 22. A screw 28 is rotatably connected with the yoke and engages a screw threaded hole 29 in the casing so that when this screw is turned the yoke will be adjusted to adjust the sliding plates 22 and the gage plates 15. The screw 28 is provided with a head 30 by which it may be rotated by the fingers. This adjustment of the gage plates will control the set of the saw teeth so that a fine or coarse set may be given to the teeth.

A stationary handle 31 has a forked end which fits within the upper part of the casing and is secured thereto by means of the pivot pins 25 and the pin 32. This pin 32 acts as a pivot for the movable handle 33 which is provided with projections 34 for engaging the block 3, the parts being so arranged that when the handle is moved downwardly upon the stationary handle the projections will force the block 3 towards the block 4 and thus cause the setting members to engage a pair of the saw teeth and thus set the same, one tooth being pressed in one direction and the other tooth in an opposite direction. By means of the rack bar and its associated parts the setting members can be properly adjusted to engage the teeth of the saw and by adjusting the gage plates vertically the desired set or pitch can be given the teeth of the saw.

It will thus be seen that both sides of the saw are set at the same time and it is not necessary to first set the teeth on one side and then set the teeth on the other side. When it is desired to straighten the teeth or take the set therefrom the lower parts of the gage plates can be placed in engagement with the saw teeth and then by pressing the handles together the straight parts of the gage plates will press the saw teeth into a straight position and thus take the set therefrom.

Lugs 35 are formed on the forked part of the stationary handle which engage the outer edges of the beveled projections on the gage plates.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A saw set of the class described comprising a supporting member having a saw receiving slot therein, a pair of blocks carried by said member, one on each side of the slot, a saw setting member carried by each block, means for moving one member longitudinally over its block, gage plates on the adjacent faces of the block, means for moving one block towards and away from the other block and means for adjusting the gage plates on the blocks.

2. A saw set of the class described comprising a supporting member having a saw receiving slot therein, a pair of blocks carried by said member, one on each side of the slot, a saw setting member carried by each block, means for moving one member longitudinally over its block, gage plates on the adjacent faces of the block, means for moving one block towards and away from the other block, means for adjusting the gage plates on the blocks, such means comprising a yoke member pivoted to the supporting member, manually operated means for adjusting the yoke member, sliding plates on the supporting member engaging the guiding plates and means for connecting the yoke member with the sliding plates.

3. A saw set of the class described comprising a casing having a saw receiving slot therein, a pair of blocks mounted in the casing, one on each side of the slot, a rack bar in one block, a stem rotatably mounted in the block, a pinion on the stem engaging the rack bar, the said block having a slot in its front face, a setting member connected with the rack bar and having a part passing through the slot, a stationary setting member on the other block and means for moving one block towards and away from the other.

4. A saw set of the class described comprising a casing having a saw receiving slot therein, a pair of blocks mounted in the casing, one on each side of the slot, a rack bar in one block, a stem rotatably mounted in the block, a pinion on the stem engaging the rack bar, the said block having a slot in its front face, a setting member connected with the rack bar and having a part passing through the slot, a stationary setting member on the other block and means for moving one block towards and away from the other, such means consisting of a pivoted lever having a part engaging the block for forcing the same towards the other block when the handle is depressed and spring means for normally holding the block away from the other block.

In testimony whereof I affix my signature.

GEORGE WESLEY MILLER.